(12) United States Patent
Lühmann et al.

(10) Patent No.: US 7,264,870 B2
(45) Date of Patent: *Sep. 4, 2007

(54) ADHESIVE TAPE

(75) Inventors: Bernd Lühmann, Norderstedt (DE); Andreas Junghans, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/988,548

(22) Filed: Nov. 20, 2001

(65) Prior Publication Data

US 2002/0051875 A1     May 2, 2002

Related U.S. Application Data

(62) Division of application No. 08/976,802, filed on Nov. 24, 1997, now Pat. No. 6,372,335.

(30) Foreign Application Priority Data

Nov. 30, 1996    (DE)   ................ 196 49 728

(51) Int. Cl.
     *C09J 7/02*      (2006.01)
     *B32B 7/12*      (2006.01)

(52) U.S. Cl. ............... 428/317.3; 428/317.3; 428/343; 428/354; 428/355 BL; 248/205.3

(58) Field of Classification Search ............ 428/317.3, 428/343, 354, 355 BL; 248/205.3
See application file for complete search history.

(56) References Cited

U.S. PATENT DOCUMENTS

| | | |
|---|---|---|
| 4,024,312 A | 5/1977 | Korpman |
| 5,516,581 A | 5/1996 | Kreckel |
| 5,643,668 A | 7/1997 | Calhounj |
| 5,759,679 A | 6/1998 | Kitamura |
| 5,897,949 A | 4/1999 | Luhmann |
| 6,231,962 B1 | 5/2001 | Bries et al. |
| 6,372,335 B1 * | 4/2002 | Lühmann et al. ........ 428/317.3 |
| 6,410,135 B1 | 6/2002 | Hamerski et al. |
| 6,541,089 B1 | 4/2003 | Hamerski et al. |
| 6,641,910 B1 | 11/2003 | Bries et al. |
| 6,821,619 B2 | 11/2004 | Hamerski et al. |
| 7,028,958 B2 | 4/2006 | Pitzen et al. |

FOREIGN PATENT DOCUMENTS

| | | |
|---|---|---|
| DE | 42 22 849 | 6/1993 |
| DE | 42 33 872 | 7/1994 |
| DE | 44 28 587 | 2/1996 |
| WO | WO92/11332 | 7/1992 |
| WO | WO93/01979 | 2/1993 |
| WO | WO94/21157 | 9/1994 |
| WO | WO95/06691 | 3/1995 |

* cited by examiner

*Primary Examiner*—Daniel Zirker
(74) *Attorney, Agent, or Firm*—Norris McLaughlin & Marcus PA

(57) ABSTRACT

Adhesive tape for a bond which can be redetached by pulling, without residue or damage, having a foam backing coated on one or both sides with a self-adhesive composition, characterized in that
    a) on at least one of the two sides of the foam backing there is applied a self-adhesive composition whose ratio of tear strength to stripping force (peel force) at a peel angle of less than 10° to the bond surface is greater than 1.2:1, and
    b) the foam backing has a modulus of electricity of less than 16 MPa and a thickness of 200-600 μm.

12 Claims, No Drawings

ADHESIVE TAPE

This application is a divisional of Ser. No. 08/976,802, filed Nov. 24, 1997, now U.S. Pat. No. 6,372,335.

The invention relates to an adhesive tape for a bond which can be redetached by pulling, without residue or damage, and to its use.

Highly extensible elastic adhesive films for redetachable bonds, which are redetachable by pulling essentially in the direction of the bond plane, are known and are obtainable commercially under the designation "tesa Power-Strips". Bonds produced therewith offer a powerful hold and yet can be released again without trace and without damage to the substrate or to the adherends, as is described in DE 33 31 016 C2. DE 4.222.849, DE 4.233.872, DE 4.428.587, DE 4.431.914 and DE 195 11 288 describe, inter alia, specific embodiments and applications of prior adhesive films.

Multilayer adhesive films which comprise highly extensible film backings of low elasticity, or highly extensible, elastic film backings, and uses of the same adhesive films, are likewise known, for instance from U.S. Pat. No. 4,024,312 "Pressure-sensitive adhesive tape for medical use—having an extensible, elastic block copolymer backing", WO 92/11332 "Removable adhesive tape" (PSA tape using highly extensible backing with photo-polymerized acrylic PSA), WO 92/11333 (PSA tape using highly extensible essentially inelastic backing), WO 93/01979 "Securing stacks with stretch adhesive tape", and WO 94/21157 "Article support using stretch releasing adhesive".

WO 92/11333, for instance, describes an adhesive tape which can be released again by pulling in the bond plane and which uses as its backing a highly stretchable, essentially nonresilient (nonelastomeric) film having a resilience after stretching of <about 50%. U.S. Pat. No. 4,024,312 describes, correspondingly, deadhering self-adhesive tapes which are essentially elastomeric in nature.

In practice it is found that it is possible in general to achieve high bond strengths with the abovementioned self-adhesive tapes on smooth and firm substrates. On rough substrates the bond strength, especially for thin products but also for self-adhesive tapes of relatively high layer thickness, is inadequate for many applications. The apparent reason for the inadequate bond strength is primarily an insufficient bond area, caused by insufficient conformability of the adhesive tapes to rough and irregular surfaces, especially when two rough substrates are to be bonded to one another. For example, when planar materials are bonded by means of tesa Power-Strips to coated woodchip wallpaper at the pressures customarily employed for press-on applications (100 N/7.4 cm$^2$), bond areas of only about 10% to 40% of the adhesive area are often achieved. However, even when bonding onto smooth planar surfaces, an inadequate bond area may be the reason for deficient bond strength. The cause is probably the inclusion of air bubbles in the bond areas. Such air bubbles can often not be removed completely even by means of high application pressures. In adverse cases, bonds having such air inclusions may be the cause of drastically reduced bond strengths relative to samples bonded over the whole area and without air bubbles.

U.S. Pat. No. 5,516,581 and WO 95/06691 describe self-adhesive tapes which are redetachable by extension substantially in the bond plane and whose backings comprise polymeric foams. In particular, WO 95/06691 describes how, by using backing materials comprising polymer foams, it is possible to obtain self-adhesive tapes which can be redetached by stretching and which have a markedly improved conformity to rough and irregular surfaces. As a consequence of the resulting increase in bond area, these products can be used to achieve high bond strengths even on rough and irregularly shaped substrates.

The foam backings described in U.S. Pat. No. 5,516,581 and WO 95/06691, however, have a number of serious disadvantages:

The foam backings employed are exclusively those which do not tear when the adhesive tapes are being detached again. Such tear proof backings, however, require a multicoat structure which is in some cases very complex; cf. claims 13, 14, 17 in U.S. Pat. No. 5,516,581 and claims 4, 15 in WO 95/06691.

Single-layer foam backings are of only limited use:

Single-layer foam backings according to claim 1 of WO 95/06691 have a minimum thickness of at least 30 mils=760 µm.

Single-layer foam backings according to claim 1 in WO 95/06691 are limited, furthermore, in that only those having a modulus of elasticity (Young's modulus) <about 2400 psi=16.9 MPa are suitable.

The resilience of the adhesive tapes described in U.S. Pat. No. 5,516,581 is in all cases <about 50% after the redetachment process. Adhesive tapes having a markedly elastic resilience, therefore, cannot be employed in accordance with the invention.

A substantial proportion of the thin-layer polymer foams which are obtainable on the market are therefore unsuitable as a material for use in the abovementioned application.

The object of the present invention was to overcome the abovementioned disadvantages.

This is achieved by means of adhesive tapes as characterized in more detail in the claims, especially the use as backing materials of polymeric foams which are characterized by a modulus of elasticity of less than 16 MPa and a layer thickness of from about 200 to about 600 µm, preferably between 300 and 550 µm, in combination with pressure-sensitive adhesive compositions which couple high stretchability with a high tear strength, as a result of which resulting self-adhesive tapes can be redetached without residue by stretching, especially in the bond plane, and neither the pressure-sensitive adhesive composition nor the foam backing used tears during the detachment process.

It is only the combination of highly stretchable pressure-sensitive adhesive compositions of high tear strength with the abovementioned polymeric foams which do not tear during the detachment process in combination with pressure-sensitive adhesive compositions employed in accordance with the invention that makes it possible to realize very thin-layer and yet highly conformative self-adhesive tapes which can be redetached without residue and without destruction by stretching, especially in the bond plane. By virtue of the high conformability even to rough substrates, such as coated woodchip wallpaper, very high bond areas are achieved in comparison with adhesive films which do not employ an intermediate foam backing.

The use of appropriate thin-layer foams makes it possible at the same time to realize low detachment forces (stripping forces), a significant advantage for practical use. In relation to the greater ease of handling of the adhesive films in the course of the detachment process, low stripping forces also make it possible to effect detachment without destruction even from highly sensitive substrates, as constituted, for example, by many wallpapers.

Another advantage of the self-adhesive tapes according to the invention is that when bonding thin flexible materials to very rough substrates, for example when bonding posters made from thin paper to woodchip wallpaper, the structure of the rough substrate is reproduced to a far lesser extent in the bonded area.

Further advantages include the small amount of material required to produce adhesive films which contain an intermediate foam backing and which can be redetached without residue or without destruction by stretching, especially in the bond plane.

Exemplary Applications

Self-adhesive tapes which can be redetached without residue and without destruction for:
original closure applications, single- and double-sided adhesive.
The fixing of posters, pictures, calendars, post-cards, signs, self-adhesive hooks, including those which are ready-made,
labels, for example price labels,
generally, for joining materials which are to be parted again at a later point in time.

Materials Employed

Pressure-sensitive Adhesive Compositions

The pressure-sensitive adhesive compositions used are preferably those based on block copolymers comprising polymer blocks formed from vinylaromatic compounds (A blocks), preferably styrene, and those formed by polymerization of 1,3-dienes (D blocks), preferably butadiene and isoprene. Both homo- and copolymer blocks can be used in accordance with the invention. Resulting block copolymers may contain identical or different D blocks, which can in part be selectively or completely hydrogenated. Block copolymers can have a linear A-D-A structure. It is also possible to employ block copolymers of radial design, and star-shaped and linear multiblock copolymers. Further components present can be A-D diblock copolymers. Block copolymers can be modified, for example functionalized by reaction with maleic anhydride. Block copolymers of vinylaromatic compounds and isobutylene can likewise be employed in accordance with the invention. All of the abovementioned polymers can be used alone or in a mixture with another. Typical use concentrations for the styrene block copolymers are in the range between 15% by weight and 75% by weight, preferably in the range between 30% by weight and 60% by weight and, with particular preference, in the range between 35% by weight and 55% by weight.

Suitable tackifiers include: rosin and its derivatives, aliphatic, aromatic-modified aliphatic, aromatic and phenol-modified tackifier resins to name but a few. The concentrations in which the resins are employed are typically in the range between 15% by weight and 75% by weight, preferably in the range between 30% by weight and 65% by weight and, with particular preference, in the range between 35% by weight and 60% by weight. In the case of the use of rosin and its derivatives it is preferred to employ esters of partially or fully hydrogenated rosin.

As end-block-compatible resins (resins compatible primarily with the vinylaromatic blocks) it is possible to use homo- and copolymers of vinylaromatic compounds, for example styrene or α-methylstyrene, polyphenylene oxides, or phenylene oxide-modified resins.

Further optimum blend components comprise plasticizer oils and liquid resins (use concentrations between 0 and max. about 35% by weight), fillers (rein-forcing and non-reinforcing), e.g. silica, especially synthetic silica, glass (ground or in the form of beads), aluminas, zinc oxides, calcium carbonates, titanium dioxides, carbon blacks, to name but a few, anti-ageing agents (primary and secondary antioxidants, light stabilizers, anti-ozonants, metal deactivators, etc.). Blend components likewise comprise polymers which exert an effect, in particular, on the ozone resistance of block copolymers, for example polyvinyl acetates and ethylene-vinyl acetate copolymers.

Other copolymers which can be present are natural and synthetic polymers such as, for example, natural rubber, synthetic polyisoprenes, polybutadienes, polychloroprenes, SBR, Kraton Liquid (Shell Chemicals), low molecular mass styrene-diene block copolymers, for example Kraton LVSI 101, polyisobutylenes, etc., which can replace up to about 50% by weight of the vinylaromatic-containing block copolymers.

Pressure-sensitive adhesive compositions according to the invention can be crosslinked chemically, especially by radiation-chemical means (for example by UV irradiation, γ irradiation or by irradiation with rapid electrons).

Adhesive compositions according to the invention are optionally those whose tackiness is brought about only by thermal activation.

In addition to the pressure-sensitive adhesive compositions described above which are based on vinylaromatic-containing block copolymers, other suitable pressure-sensitive adhesive compositions are those which have sufficient tear strength and cohesion for the detachment process. Such pressure-sensitive adhesive compositions can be employed alone or in combination with those based on vinylaromatic-containing block copolymers. Examples of compounds suitable in accordance with the invention are adhesive acrylate copolymers copolymerized with macromonomers, the macromonomers having a glass transition temperature of >+40° C. The high tear strength of such copolymers is probably achieved by the association of the macromonomers. Examples of suitable macromonomers are methacryloyl-terminated polymethyl methacrylates.

Foams

Suitable foams (foam backings) are based preferably on polyolefin homo- and copolymers. Homo- and copolymers can be employed alone or in a mixture. Ethylene-vinyl acetate copolymers, and also mixtures of ethylene-vinyl acetate copolymers and/or polyvinyl acetates with polyethylene, are used with particular preference, the polyethylenes employed preferably being those of low density (LDPE, LLDPE, VLDPE). Further suitable polymers are: polyvinyl acetates, EPDM, thermoplastic elastomers based on styrene block copolymers, polyurethanes based on aromatic and aliphatic diisocyanates, PVC, polychloroprenes and natural rubber.

The thicknesses of the foams employed are, in particular, between about 150 µm and 600 µm, preferably between 250 µm and 550 µm. Bulk densities are from about 40 kg/m$^3$ to 45 kg/m$^3$, preferably from 50 kg/m$^3$ to 300 kg/M$^3$. It is possible to use foams of integral or non-integral structure, with or without a skin.

Anchoring of the Pressure-sensitive Adhesive Compositions to the Foams

To produce a sufficient anchorage of the pressure-sensitive adhesive compositions that are employed to the foams, the latter are advantageously subjected to a pressure pretreatment in the course of foam production and/or prior to coating. Suitable pretreatment processes include fluorine pretreatment, corona pretreatment, plasma treatment and flame pretreatment, the latter in particular by means of an electrically polarized flame. Pretreatment methods can be employed alone or in combination. In the case of foams with a skin and integral foams, the foam can be primed in order to improve still further the anchorage of the adhesive composition.

Between the foam and the pressure-sensitive adhesive compositions it is possible, optionally, to integrate a barrier layer in order to reduce the passage of migratable materials between pressure-sensitive adhesive compositions and backings.

Self-adhesive Tapes

Self-adhesive tapes according to the invention comprise at least one foam backing which is equipped on one or both sides with a pressure-sensitive adhesive composition. The adhesive tapes are of sufficient elongation at break and tear strength to enable their redetachment from the bond substrates without residue and without destruction by stretching in particular in the bond plane. In the case of foam backings coated on both sides with pressure-sensitive adhesive composition, the adhesive compositions can be identical or different in formulation, may cover the foam over its entire area or partly, for instance in a strip, and can be applied in an identical or different amount to both sides of the adhesive tape. Adhesive compositions can be composed of one or more layers of adhesive composition. For example, an adhesive layer can consist of two strata both of which use vinylaromatic-containing block copolymers but where the block copolymers are different. In addition, an adhesive layer based on natural rubber or polybutadiene or polyisobutylene or "Kraton Liquid" (Shell Chemicals) or mixtures of the abovementioned polymers can be applied to a first adhesive layer comprising vinylaromatic-containing block copolymers.

Self-adhesive tapes are characterized in that their elongations at break are greater than 200%, preferably greater than 300% and, with particular preference, greater than 400%.

The tear strengths of the pressure-sensitive adhesive compositions used are in particular greater than 1.5 MPa, preferably greater than 3 MPa and, with particular preference, greater than 5 MPa.

Layer thicknesses of the pressure-sensitive adhesive compositions which determine the tear strength are in particular $\geq$ about 60 μm, preferably $\geq$ 100 μm and, with particular preference, $\geq$ 150 μm.

The ratio of tear strength to stripping force of the self-adhesive tapes at peel angles of less than 10° relative to the bond surface is greater than 1.2:1, preferably greater than 1.5:1, and, with particular preference, greater than 2:1.

Manufacturing Form

Manufacturing forms of adhesive tapes according to the invention include both rolls of adhesive tape and sections of adhesive tape of defined dimensions, for example in the form of punched sections. Adhesive tape sections of defined dimensions may optionally have a shaped end in accordance with DE 4.428.587, for instance an end which comes together in a point, or may be equipped, in accordance with DE 4.431.914, with a release-coated grip-tab film or with coated release paper.

Production

Adhesive films according to the invention can be produced by solvent coating, cold- or hot-lamination and by melt coating of the foams that are to be used.

Test Methods

Maximum Tensile Strength, Elongation at Break

The measurements are carried out in accordance with DIN 53504 using standard test specimens of size S 2 at a separation rate of 300 mm/min.

Modulus of Elasticity

The modulus of elasticity is determined in accordance with ASTM D 882 with the following test specimen dimensions: length of test strip=140 mm; clamped length (distance between clamping jaws)=100 mm; width of test strip=15 mm. Separation rate=25.4 mm/min.

Tip Shear Strength

To determine the tip shear strength, the adhesive film to be tested, which measures 20 mm*50 mm, and is provided at one end on both sides with a non-tacky grip-tab region (obtained by laminating on 25 μm thick biaxially oriented polyester film measuring 20 mm*13 mm (Hostaphan RN 25)) is bonded to the center of a highly polished square steel plate measuring 40 mm*40 mm*3 mm (length*width*thickness). On its back the steel plate is provided centrally with a 10 cm long steel rod which sits vertically on the surface of the plate. The test specimens obtained are bonded to the test substrate with a force of 100 N (press-on time=5 s) and are left in the unloaded state for 5 minutes. After setting the chosen tip shear load by suspending a weight (lever arm and mass of the weight are selectable), the time until the bond fails is measured.

Detachment Force (Stripping Force)

To determine the detachment force (stripping force) an adhesive film measuring 50 mm*20 mm (length * width) with a non-tacky grip-tab region (see above) at the top end is bonded between two steel plates (arranged so as to overlap one another precisely) measuring 50 mm×30 mm, in accordance with the procedure described under "Tip shear strength" but with application pressures of 500 N in each case. The steel plates each carry at their lower end a bore for accommodating an S-shaped steel hook. The bottom end of the steel hook carries a further steel plate, by means of which the test setup can be fixed into the lower clamping jaw of a tensile tester for measurement. The bonds are stored at +40° C. for 24 h. After reconditioning to RT, the adhesive film strip is pulled out parallel to the bond plane at a traction rate of 1000 mm/min. During this procedure the detachment force (stripping force) required is measured in N/cm. Finally, the steel plates are checked for residues of adhesive composition.

Bond Area on Glass

Adhesive film strips measuring 20 mm×50 mm are bonded centrally onto a planar steel substrate measuring 200 mm×100 mm. The resulting assembly is bonded vertically and with precise overlap to a glass plate of the same dimensions and is pressed on with a force of 100 N applied uniformly and centrally. The press-on time is 5 s. The measurement is carried out in triplicate. The bond area obtained on the glass surface is determined visually and expressed as a percentage of the surface area of the adhesive film.

Bond Area on Woodchip Wallpaper

To determine the bond area on rough substrates, adhesive film strips measuring 20 mm×50 mm are bonded centrally to a planar steel substrate measuring 200 mm×100 mm. The resulting assembly is placed vertically and with precise overlap on a coated woodchip wallpaper (wallpaper: Erfurt Körnung 52; color: Herbol Zenit LG; wallpaper bonded to compression chipboard) having the same dimensions which has been given a thin powdering of aluminium bronze and is pressed on with a force of 100 N applied uniformly and centrally. The press-on time is 5 s. The measurement is carried out in triplicate. Samples can readily be lifted vertically from the powdered woodchip wallpaper. The bond area obtained is determined visually by means of the aluminium bronze which has been transferred to the surface of the adhesive film and is expressed as a percentage of the surface area of the adhesive film.

Testing for Residueless and Non-destructive Redetachment

A corresponding test is carried out as part of the determination of the detachment force (stripping force) (see above) for the substrates steel//steel. In tests for redetachability without residue and without destruction on other substrates as well, for example PMMA//coated woodchip wallpaper (wallpaper, Erfurt Körnung 52; color: Herbol Zenit LG; wallpaper bonded to compression chipboard), appropriate test specimens are produced, as described above under "Detachment force (stripping force)", and the bond is parted (stripped) either mechanically or manually. An assessment is made of whether residues of adhesive composition are present on the bond substrates and, respectively, of whether it is possible to detect instances of destruction of the bond substrates.

EXAMPLES

Example 1

A pressure-sensitive adhesive composition consisting of 20 parts of SBS block copolymer (Vector 8508, Exxon), 80 parts of SIS block copolymer (Vector 4211, Exxon), 100 parts of a penta ester of partially hydrogenated rosin (Foralyn 110, Hercules) and 1 part of a primary antioxidant (Irganox 1010, Ciba Geigy) [=formulation 1] or a pressure-sensitive adhesive composition consisting of 50 parts of natural rubber having a K value of 145, 50 parts of Foralyn 110 and 1 part of Irganox 1010 [=formulation 2] is applied by cold lamination to both sides of the foams listed below. For this purpose the chosen foam is placed on the pressure-sensitive adhesive, which is on siliconized release paper, and then rolled over five times with a rubber-coated steel roller 25 cm wide with an application pressure of 50 N. The intermediate product obtained in this way is coated with pressure-sensitive adhesive on the second side in an identical manner. Tests are carried out after the resulting samples have been conditioned for 24 hours in a climatically controlled chamber (50% relative humidity, T=RT=23° C.). Test specimens (adhesive films) are in all cases punched out transversely to the direction of manufacture of the foam backing used. This results in the following properties:

| Sample designation | Trade name of foam | Type of foam | Manufacturer |
| --- | --- | --- | --- |
| 3.001A | Alveolit TEE 0400.35 | EVAc copolymer | Alveo AG |
| 3.006 | Alveolit TEE 0500.51 | EVAc copolymer | Alveo AG |
| 3.009 | Alveolit TEE 0400.35 | EVAc copolymer | Alveo AG |
| 3.010 | Alveolit TEE 0500.51 | EVAc copolymer | Alvee AG |
| 3.000A | — | — | — |
| 3.000B | — | — | — |

| Sample designation | Foam thickness in μm | Density in kg/m$^3$ | Amount of adhesive applied Sides A//B | Adhesive formulation |
| --- | --- | --- | --- | --- |
| 3.00A | 350 | 250 | 200//210 g/m$^2$ | [1] |
| 3.006 | 510 | 200 | 200//200 g/m$^2$ | [1] |
| 3.009 | 350 | 250 | 56//56 g/m$^2$ | [2] |
| 3.010 | 510 | 200 | 56//56 g/m$^2$ | [2] |
| 3.000A | — | — | 360 g/m$^2$ | [1] |
| 3.000B | — | — | 650 g/m$^2$ | [1] |

| Sample designation | Maximum tensile strength Lengthwise | Elongation at break | Stripping force Lengthwise/ transverse | Does foam tear? | Strippable without residue or tearing? |
| --- | --- | --- | --- | --- | --- |
| 3.001A | 39 N/cm | 1050% | 15/n.d.N/cm | no | yes |
| 3.006 | 30 N/cm | 950% | 19/13 N/cm | no | yes |
| 3.009 | — | — | — | yes | no |
| 3.010 | — | — | — | yes | no |
| 3.000A | 44 N/cm | 1300% | — | — | yes |
| 3.000B | 59 N/cm | 1200% | — | — | yes |

| Sample designation | Tip shear stability | Modulus of elasticity of foam backing Lengthwise/ transverse | Bond area in % on woodchip//on glass | |
| --- | --- | --- | --- | --- |
| 3.001A | >30 days | 14.3 MPa/9.1 MPa | about 90% | about 90% |
| 3.006 | >30 days | 10.0 MPa/6.7 MPa | >95% | >95% |
| 3.009 | n.d. | 14.3 MPa/9.2 MPa | n.d. | n.d. |
| 3.010 | n.d. | 10.0 MPa/6.7 MPa | n.d. | n.d. |
| 3.000A | 4-6 days | — | about 30% | 40-50% |
| 3.000B | 8-12 days** | — | about 40% | 60-70% | n.d. = not determined
**Woodchip wallpaper splits

In this example the only adhesive films comprising an intermediate foam backing that can be redetached without residue or without destruction are those which use pressure-sensitive adhesive compositions having a sufficiently high tear strength. The use of the intermediate foam backings achieves a virtually 100-percent bond area both on the rough woodchip substrate selected and on the smooth glass substrate. The resulting bonding strengths (tip shear stabilities) for the adhesive films which utilize an intermediate foam backing are markedly greater than those of the adhesive film which has no intermediate foam backing.

Example 2

A pressure-sensitive adhesive composition in accordance with formulation [1] is applied to both sides of the foams listed below. The adhesive film samples are prepared as in Example 1. The results obtained are as follows:

| Sample designation | Trade name of foam | Type of foam | Manufacturer |
|---|---|---|---|
| 3.006 | Alveolit TEE 0500.51 | EVAc copolymer | Alveo AG |
| 3.019 | Alveolit TEE 0501.2 | EVAc copolymer | Alveo AG |

| Sample designation | Foam thickness in μm | Density in kg/m$^3$ | Amount of adhesive applied Sides A//B | Adhesive formulation |
|---|---|---|---|---|
| 3.006 | 510 | 200 | 200/200 g/m$^2$ | [1] |
| 3.019 | 1200 | 200 | 200/200 g/m$^2$ | [1] |

| Sample designation | Maximum tensile strength | Elongation at break | Stripping force transverse | Does foam tear? | Strippable without residue or tearing?* |
|---|---|---|---|---|---|
| 3.006 | 30 N/cm | 950% | 13.3 N/cm | no | yes |
| 3.019 | 40 N/cm | 1100% | 20.5 N/cm | no | yes |

*Bond substrates steel//steel

In this example the use of a very thin foam markedly reduces the detachment force and, consequently, significantly facilitates detachment.

The invention claimed is:

1. An adhesive tape which can be bonded to a substrate and thereafter released from the substrate without leaving a residue or damaging the substrate by pulling on the adhesive tape, said adhesive tape comprising:
    a) a backing comprising a foam material, said backing having a thickness of 200-600 μm, and exhibiting a modulus of elasticity of less than 16 MPa; and
    b) self-adhesive composition on one or both sides of said backing, said self-adhesive composition exhibiting a ratio of tear strength to stripping force (peel force) of greater than 1.2:1 at a peel angle of less than 10° from the surface of a bond formed between said adhesive tape and said substrate;

whereby the backing is selected such that the backing would tear if the backing was pulled by itself without the self-adhesive composition with the same force necessary to remove said adhesive tape from said substrate, but the backing does not tear when said adhesive tape is removed from said substrate.

2. The adhesive tape according to claim 1, wherein the foam backing is coated on both sides with self-adhesive composition.

3. The adhesive tape according to claim 1, wherein the self-adhesive composition is based on block copolymers.

4. The adhesive tape according to claim 3, wherein the block copolymers comprise polymer blocks of vinylaromatic compounds.

5. The adhesive tape according to claim 4, wherein the block copolymers further comprise polymer blocks formed by polymerization of 1,3-dienes.

6. The adhesive tape according to claim 1, wherein the self-adhesive composition comprises tackifiers, and optionally further blend components and/or additives.

7. The adhesive tape according to claim 1, wherein the foam backing has a modulus of elasticity of 4-15 MPa.

8. The adhesive tape according to claim 1, wherein the foam backing has a thickness of 300-550 μm.

9. The adhesive tape according to claim 1, which is in the form of sections, wherein one end of each section comprises a non-tacky grip, and an opposite end of each section optionally comprises an adhesive area which decreases in size towards an end of the section.

10. The adhesive tape according to claim 9, wherein the non-tacky grip is formed by laminating film section on the self-adhesive composition, wherein the sides of the film sections which contact the self-adhesive composition have been given an anti-adhesive finish.

11. A method for bonding an adhesive tape to a substrate and optionally thereafter releasing the adhesive tape from said substrate without leaving an adhesive residue on said substrate, said method comprising the following steps:
    a) applying an adhesive tape according to claim 1 to a substrate so as to form a bond between said adhesive tape and said substrate; and
    b) optionally releasing said bond by pulling on the adhesive tape.

12. The method according to claim 11, which further comprises bonding the adhesive tape to a hook, a baseplate or an article to be suspended from said substrate, wherein said bonding of the adhesive tape to said hook, baseplate or article is carried out either before or after the adhesive tape is bonded to said substrate.

* * * * *